(12) United States Patent
Tov et al.

(10) Patent No.: US 12,143,928 B2
(45) Date of Patent: Nov. 12, 2024

(54) METHOD AND APPARATUS FOR PROVIDING DEVICE TO DEVICE COMMUNICATIONS

(71) Applicant: MOTOROLA SOLUTIONS, INC., Chicago, IL (US)

(72) Inventors: Jacob Shem Tov, Jerusalem (IL); Eli Katlan, Modiin (IL); Mctoria Yannay, Tel Aviv-Yaffo (IL); Michael Yutsis, Rehovot (IL); Oren Zakaria, Raanana (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 388 days.

(21) Appl. No.: 17/651,907

(22) Filed: Feb. 22, 2022

(65) Prior Publication Data

US 2023/0269660 A1    Aug. 24, 2023

(51) Int. Cl.
*H04W 48/18* (2009.01)
*H04W 8/00* (2009.01)
*H04W 76/14* (2018.01)

(52) U.S. Cl.
CPC ........... *H04W 48/18* (2013.01); *H04W 8/005* (2013.01); *H04W 76/14* (2018.02)

(58) Field of Classification Search
CPC ...... H04W 48/18; H04W 76/14; H04W 8/005
See application file for complete search history.

(56) References Cited

U.S. PATENT DOCUMENTS

| | | | |
|---|---|---|---|
| 10,834,769 B2 | 11/2020 | Sivakumar et al. | |
| 11,553,378 B2 * | 1/2023 | Hua | H04W 48/18 |
| 11,601,819 B2 * | 3/2023 | Chou | H04W 16/10 |
| 11,824,736 B2 * | 11/2023 | Celozzi | H04L 41/5051 |
| 2019/0349951 A1 | 11/2019 | Ahmad | |
| 2022/0030407 A1 | 1/2022 | Bercovici et al. | |
| 2022/0369215 A1 * | 11/2022 | Dees | H04W 76/12 |

FOREIGN PATENT DOCUMENTS

| | | |
|---|---|---|
| WO | 2021001086 A1 | 1/2021 |
| WO | 2022029265 A1 | 2/2022 |

OTHER PUBLICATIONS

The International Search Report and the Written Opinion, corresponding patent application No. PCT/US2023/011572 filed: Jan. 26, 2023, mailed: Apr. 3, 2023, all pages.

* cited by examiner

*Primary Examiner* — Chandrahas B Patel
(74) *Attorney, Agent, or Firm* — Daniel R Bestor (57) ABSTRACT

A method and apparatus for providing discovery within a D2D communications is provided herein. During operation, a first device will determine an identification of its own network slice, and an identification of a network slice other devices operate on. Only devices operating on the same network slice as the first device are allowed for D2D communication with the first device.

16 Claims, 5 Drawing Sheets

METHOD AND APPARATUS FOR PROVIDING DEVICE TO DEVICE COMMUNICATIONS

BACKGROUND

Device-to-device (D2D) communication is expected to play a significant role in upcoming public-safety networks as it promises direct communication among users even when the communication system infrastructure goes down, or is otherwise unavailable. For D2D communication to work, the devices communicating with each other must be relatively close to each other (e.g., within ½ km), and devices must know of each other's existence and whether or not communications are allowed between devices. This is accomplished through a discovery process. After discovery, devices will know which other devices are nearby and whether they are allowed to communicate with via D2D communications. As is evident, efficient discovery is key to implementing D2D communications. Therefore, a need exists for a method and apparatus for providing D2D communications among devices that efficiently provides a mechanism for devices to discover each other.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

In order to address the above-mentioned need, a method and apparatus for providing discovery within a D2D communications is provided herein. During operation, a first device will determine an identification of its own network slice, and an identification of a network slice other devices operate on. Only devices operating on the same network slice as the first device are allowed for D2D communication with the first device.

Consider the following example: A first device is operating within a network slice supporting communications at an incident scene. The first device is periodically updated with network slice information for other devices. If the communications network goes down, or is otherwise unavailable, the first device will determine network slice information for the other devices within range in order to determine those devices capable of D2D communications with the first device. D2D communications can then take place among devices within range having the same network slice.

A communication system configured into network slices can be defined as a network configuration that allows multiple virtual networks to be created on top of a common physical infrastructure. This configuration has become an essential component of the overall 5G architectural landscape. Each "slice" or portion of the network can be allocated based on the specific needs of the application, use case, or customer. For example, network infrastructure can be configured to support a first network slice that provides infrastructure for things like smart-parking meters that value high reliability and security and are more forgiving with respect to latency. The same network infrastructure can be configured to support a second network slice to supply infrastructure for other devices (like driver-less cars) that may need ultra-low latency and high data speeds. Network slicing in 5G supports these diverse services and facilitates the efficient reassignment of resources from one virtual network slice to another.

As is evident, the same infrastructure can be utilized to provide many virtual networks (network slices), with each virtual network having its own unique performance requirements, making the one-size-fits-all approach to service delivery obsolete. Each network slice will have an identification (for example specific IP addresses, name, or other attribute that distinctly identifies the network slice).

With the above in mind, the network slice identification can be used to determine what devices to communicate with for D2D operation so that only devices on the same network slice are allowed to communicate with each other utilizing D2D communication techniques.

Figure 1:
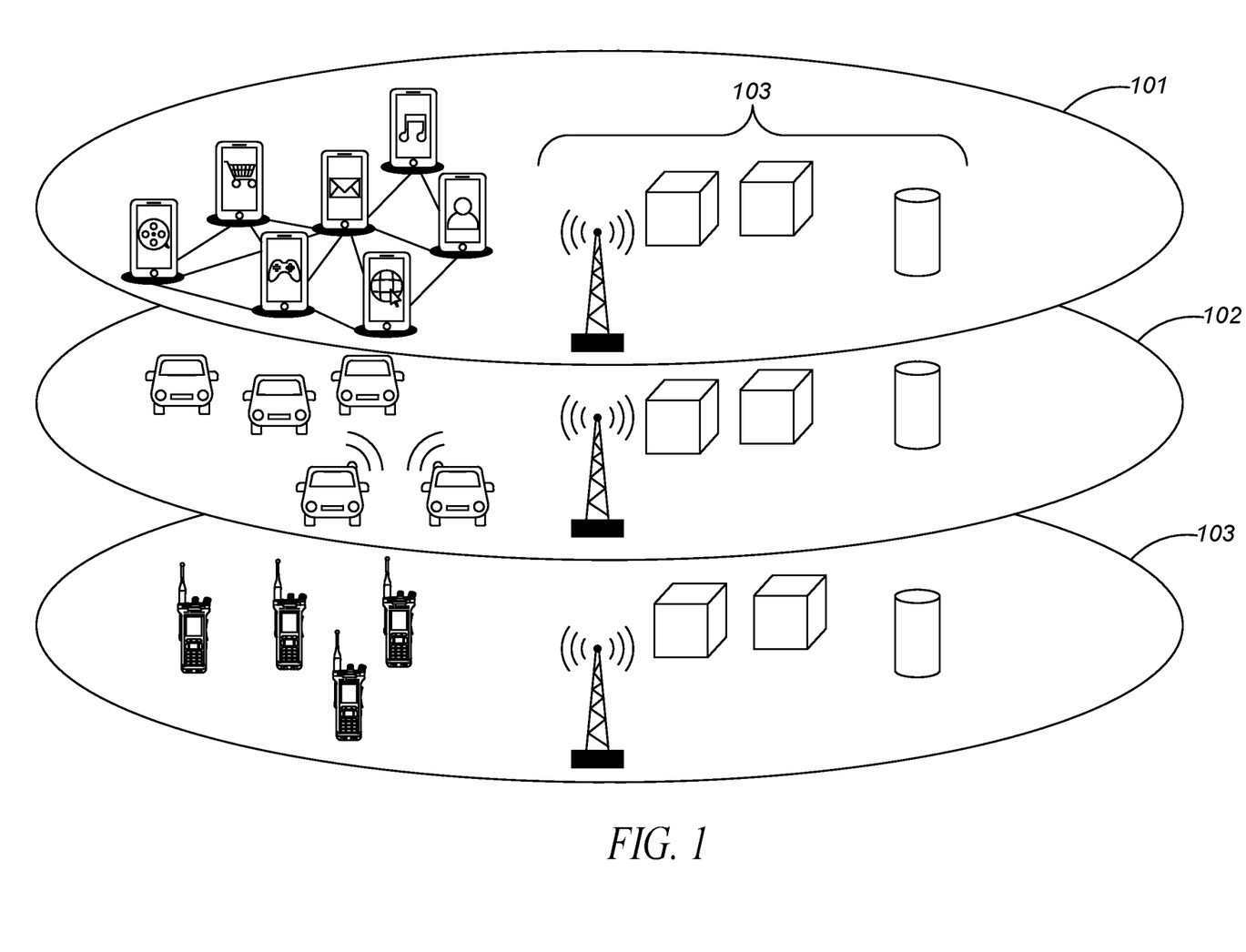
FIG. 1 illustrates 5G network slices

FIG. 1 illustrates a network configured with network slices. As shown in FIG. 1, the same network equipment 104 is configured to provide three virtual networks (network slices) for various devices. In this example, a first virtual network (first virtual network slice) 101 is utilized to provide smart phones with cellular coverage, while a second virtual network (second network slice) 102 is utilized for vehicle-to-vehicle communications among smart automobiles. Finally, a third virtual network (third network slice) 103 is utilized to provide communications among police radios at a particular incident scene.

Figure 2:
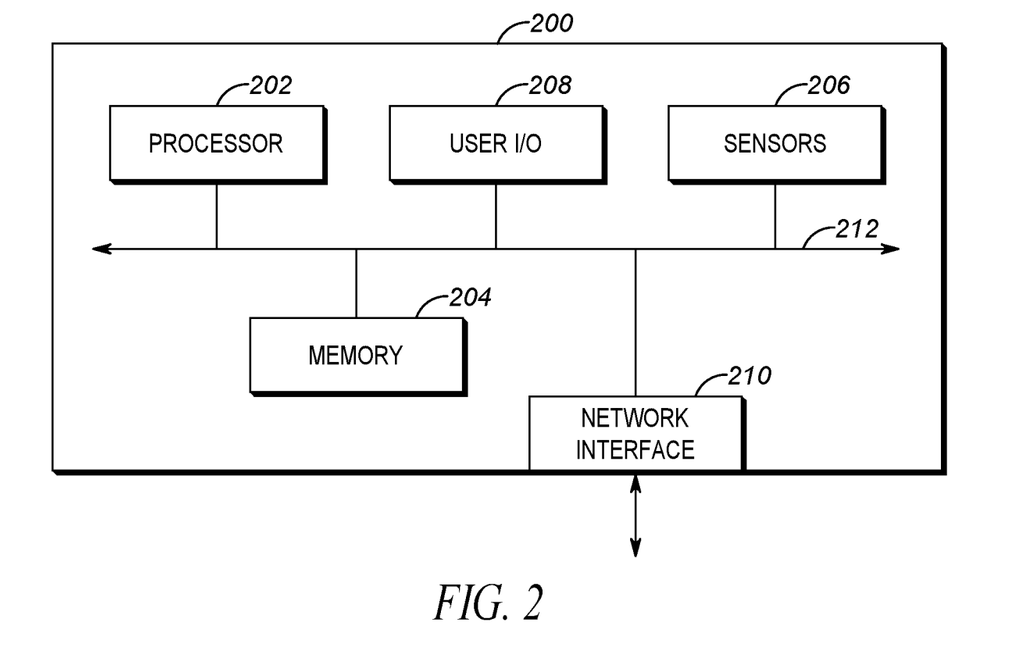
FIG. 2 illustrates a block diagram of a communication device in accordance with some embodiments.

FIG. 2 illustrates a block diagram of a communication device 200 (sometimes referred to as apparatus 200) in accordance with some embodiments. In various examples, communication device 200 may be a police radio, a mobile telephone, parking meter, IoT device, automobile, a smartphone, any device capable of D2D communications. Device 200 is also capable of executing instructions (sequential or otherwise) that specify actions to be taken by the device.

Communication device 200 may include various components connected by a bus 212. Communication device 200 may include a hardware processor (logic circuitry) 202 such as one or more central processing units (CPUs) or other processing circuitry able to provide any of the functionality described herein when running instructions. Processor 202 may be connected to a memory 204 that may include a non-transitory machine-readable medium on which is stored one or more sets of instructions.

Memory 204 may include one or more of static or dynamic storage, or removable or non-removable storage, for example. A machine-readable medium may include any medium that is capable of storing, encoding, or carrying instructions for execution by processor 202, such as solidstate memories, magnetic media, and optical media. Machine-readable medium may include, for example, Electrically Programmable Read-Only Memory (EPROM), Random Access Memory (RAM), or flash memory.

Memory 204 is used for storing network slice information. More particularly, memory 204 will keep a table of devices 200 and their associated network slices.

The instructions stored in memory 202 may enable communication device 200 to operate in any manner thus programmed, such as the functionality described specifically herein, when processor 202 executes the instructions. The machine-readable medium may be stored as a single medium or in multiple media, in a centralized or distributed manner. In some embodiments, instructions may further be transmitted or received over a communications network via a network interface 210 utilizing any one of a number of transfer protocols (e.g., frame relay, internet protocol (IP), transmission control protocol (TCP), user datagram protocol (UDP), hypertext transfer protocol (HTTP), etc.).

Network interface 210 may thus enable communication device 200 to communicate voice, data, and control information with other devices via wired or wireless communication. Network interface 210 may include electronic components such as a transceiver that enables serial or parallel communication. The wireless connections may use one or more protocols, including Institute of Electrical and Electronics Engineers (IEEE) Wi-Fi 802.11, Long Term Evolution (LTE)/4G, 5G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHz range, 1.8-1.9 GHz range, 2.3-2.4 GHz range, 60 GHz range, and others, including infrared (IR) communications. Example communication networks to which communication device 200 may be connected via network interface 210 may include a local area network (LAN), a wide area network (WAN), a packet data network (e.g., the Internet), mobile telephone networks (e.g., cellular networks), and wireless data networks.

Communication device 200 may further include one or more sensors 206, such as one or more of an accelerometer, a gyroscope, a global positioning system (GPS) sensor, a thermometer, a magnetometer, a barometer, a pedometer, a proximity sensor, and an ambient light sensor, among others. Sensors 206 may include some, all, or none of one or more of the types of sensors above (although other types of sensors may also be present), as well as one or more sensors of each type.

Sensors 206 may be used in conjunction with one or more user input/output (I/O) devices 208. User I/O devices 208 (user interface) may include one or more of a display, a camera, a speaker, a keyboard, a microphone, a mouse (or other navigation device), or a fingerprint scanner, among others. User I/O devices 208 may include some, all, or none of one or more of the types of I/O devices above (although other types of I/O devices may also be present), as well as one or more I/O devices of each type.

Communication device 200 is configured to function within a network slice of a communication system by communicating over a virtual network having a specific identification. Communication device 200 is also configured to communicate with other devices 200 when network infrastructure goes down, or is otherwise unavailable.

A network slice (also referred to herein and interchangeably as a virtual network function (VNF), can be created via software to permit general purpose computers in a centralized or distributed manner to provide one or more network functions as one or more network slices of a Network Function Virtualization (NFV) architecture. The NFV architecture may support multiple independent networks (slices) that may each contain all of the functionality available in the NFV architecture.

Figure 3A:
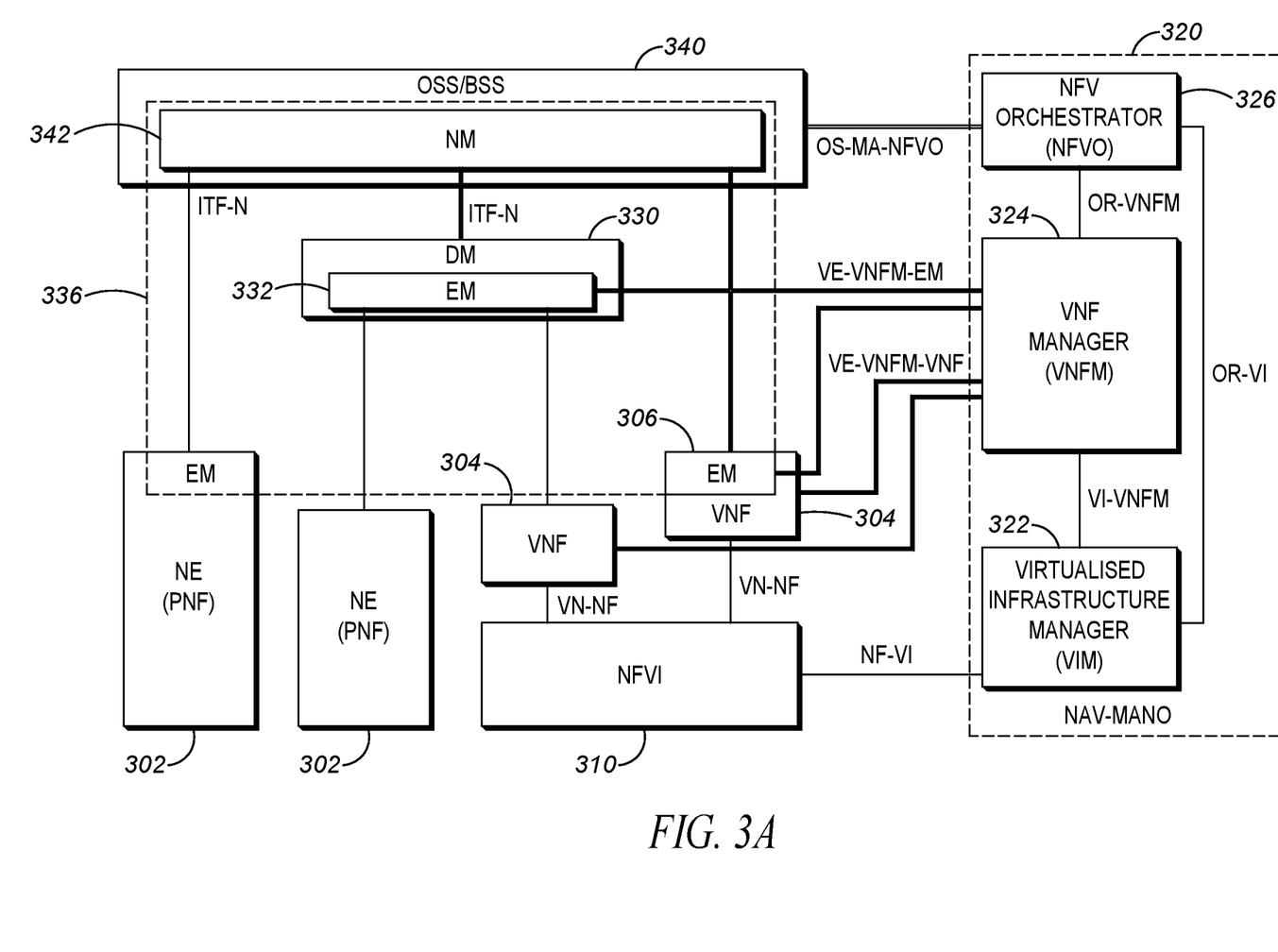
FIG. 3A illustrates a network function virtualization (NFV) network management architecture in accordance with some embodiments.

FIG. 3A illustrates an NFV architecture 300 in accordance with some embodiments. NFV architecture 300 functions to both implement slices and manage and orchestrate the slices so implemented over the life cycle of each slice. The life cycle of each slice may include commissioning (creation/instantiation) of the slice, operation or maintenance of the slice (including activation, supervision, reporting, modification, and de-activation), and decommissioning (termination) of the slice.

NFV architecture 300 may include physical components that implement virtualized components with different functionality. NFV architecture 300 may be implemented by, for example, a data center comprising one or more servers in the cloud. NFV architecture 300 may include one or more physical devices and multiple applications hosted on one or more platforms. These platforms may include, among others, a localized platform, such as a server, or a distributed platform, such as a cloud computing platform or other distributed computing platform. NFV architecture 300 as illustrated may include Network Elements (NEs) 302, Virtual Network Functions 304, a Network Virtualization Function Infrastructure (NVFI) 306, a Network Functions Virtualization Orchestrater (NFV-MANO) 320, a Domain Manager (DM) 330, and an Operations Support System/Business Support System (OSS/BSS) 340.

NEs 302 may provide physical components (physical network functions—PNFs), such as dedicated hardware (e.g., processors, antennas, amplifiers, isolators, clock circuitry, transmit and receive chains, among others), as well as software. NFV architecture 300 may include multiple Network Functions (NFs), which each provides a specific functional behavior and has well-defined external interfaces.

VNFs 304 may be an implementation (both components and connectivity when instantiated) of at least one NF instantiated in or deployed on (runs on) NFVI 310. The network slice thus provides functionality of the NF(s), elements supporting the NF functionalities (e.g., library, database, protocol stacks), and elements enabling VNF 304 to run on NFVI 310. The NF functionality and NF elements supporting the NF functionality in each VNF 304 may be managed by an element manager (EM) 306 in that VNF 304. Each VNF 304 may provide a network function that is decoupled from at least some of the infrastructure resources (computational resources, networking resources, memory) used to provide the NF. VNFs 304 can be chained together to realize a desired network service. The virtualized resources may provide VNFs 304 with desired network resources.

VNFs 304, like NEs 302, may be managed by one or more EMs 306. EM 306 may provide functions for management of virtual or physical network elements, depending on the instantiation. EM 306 may manage individual NEs 302 and NEs 302 of a sub-network, which may include relations between NEs 302. For example, EM 306 of a VNF 304 may be responsible for configuration for the NFs provided by VNF 304, fault management for the network functions provided by VNF 304, accounting for the usage of network slice functions of VNF 304, and collecting performance measurement results for the functions provided by VNF 304.

NFVI 310 includes all hardware and software in the environment in which network slices 310 are deployed.

NFVI 310 contains a NFVI node that has one or more physical devices deployed and managed as a single entity to provide the NFVI functions to support the network slice environment. NFVI 310 may control VNFs 304 via Vn-Nf reference points. Although not shown, NVFI 310 may contain both virtualized and non-virtualized resources that provide computational abilities, storage (either block or file-system level) and networking elements that may include networks, subnets, ports, addresses, links and forwarding rules to ensure intra- and inter-network slice connectivity.

NFV-MANO 320 may include a Virtualized Infrastructure Manager (VIM) 322, a network slice Manager (VNSM) 324, and a Network Function Virtualization Orchestrator (NFVO) 326. NFV-MANO 320 may manage NFVI 310. NFV-MANO 320 may create or terminate a network slice 320, increase or decrease network slice capacity, or update or upgrade software and/or configuration of a VNF 304. NFV-MANO 320 may have access to various data repositories including network services, network slices available, NFV instances and NFVI resources with which to determine resource allocation.

NFV-MANO 320 may thus orchestrate the instantiation of network services, and the allocation of resources used by VNFs 304. NFV-MANO 320 may, along with OSS/BSS 340, be used by external entities to deliver various NFV business benefits. OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling.

VIM 322 is responsible for controlling and managing the NFVI resources, including the compute, storage and network resources. VIM 322 may be specialized in handling a particular type of NFVI resource (e.g., compute-only, storage-only, networking-only), or may be capable of managing multiple types of NFVI resources. VIM 322 may orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g., hypervisors), and discovery of the capabilities and features (e.g., related to usage optimization) of such resources. To this end, VIM 322 may control and manage the NFVI resources via Nf-Vi reference points. VIM 322 may further collect and forward performance measurements and events to VNSM 324 via Vi-VNSM reference point and to NFVO 326 via the Or-Vi reference point.

VNSM 324 is responsible for the lifecycle management of network slices 324 through a Ve-Vnfm-vnf reference point. VNSM 324 may orchestrate NFVI resources via VIM 322 and provide overall coordination and adaptation for configuration and event reporting between VIM 322 and EMs 306 and Network Managers (NMs) 342 via a Ve-Vnfm-em reference point. VNSM 350 may be assigned the management of a single network slice 320, or the management of multiple network slices 320 of the same type or of different types. To this end, VNSM 324 may discover available services, manage virtualized resource availability/allocation/release and provide virtualized resource fault/performance management, in addition to providing service lifecycle management that may include instantiating a network slice, modifying the network slice instances, and terminating the network service, as well as releasing the NFVI resources for the service to the NFVI resource pool to be used by other services.

NFVO 326 manages the Network Service (NS) lifecycle and coordinates the management of the NS lifecycle, the network slice lifecycle (supported by the VNSM) and the NFVI resources (supported by VIM 322) to ensure an optimized allocation of the necessary resources and connectivity. NFVO 326 may coordinate VNFs 304 as part of network services that jointly realize a more complex function, including joint instantiation and configuration, configuring connections between different VNFs 304 and managing dynamic changes of the configuration. NFVO 326 may provide this orchestration through an OS-Ma-NFVO reference point with NM 342 of the OSS/BSS 340, which may also include a domain manager (DM) 330 that itself contains an EM 332.

EMs 306, 322 (whether in a network slice 306 or NE 302) may be managed by NM 342 of OSS/BSS 340 through Itf-N reference points. NM 342 may provide functions with the responsibility for the management of a network, mainly as supported by EM 332 but may also involve direct access to the network elements. NM 342 may connect and disconnect network slice external interfaces to physical network function interfaces at the request of NFVO 326.

With the advent of 5G networks and disparate types of devices (such as Machine Type Communication (MTC), enhanced Mobile Broadband (eMBB) and Ultra-Reliable and Low Latency Communications (URLLC) devices) using these networks, network management and network slicing is evolving towards a service-based architecture in which virtualization is used. To provide network management and slicing, network provisioning and resource management, fault supervision, performance management (PM) and reporting, and management data analytics may be enabled.

As discussed above, network slicing is virtualization that uses the architecture shown in FIG. 3A to provide multiple configurable logical and independent networks as independent network slice instances (NSIs) to different consumers, such as eMBB, healthcare, automotive, safety or mission critical, and IoT users. Each NSI may provide a desired network service, which is isolated from the network resources of other NSIs and may thus allow an optimized topology and specific configuration to be developed for each NSI based on the desired network services. Examples of various network services may include big data, edge computing, cloud storage, and platform security, among others. The configuration may enable various aspects of network capability to be tailored for the NSI. These aspects may include guaranteed Quality of Service (QoS), throughput, latency, reachability, data security, mobility, and massive connectivity, among others.

For example, an eMBB NSI may be designed to contend with large data volumes and increased data capacity and user density, a massive MTC NSI may be designed to support large numbers of connected devices with low data rates, and a URLLC NSI may be designed to cater for mission-critical situations and devices. In particular, an NSI designed for a massive number of IoT devices, which may have unique charging and control functionality that are dependent on the industry requesting the NSI—in one instance, real-time vehicle traffic information, which may collect a large number of disparate pieces of information from MTC terminals in vehicles and infrastructure for analysis and dissemination to users (e.g., map updates and route determination). Vehicles themselves may use a different NSI to enable URLLC for autonomous driving, vehicle-to-vehicle (V2V) communication, and data gathering and analysis from telemetry sensors, while also providing high throughput for entertainment functionality.

Each NSI may contain one or more Network Slice Subnet Instance (NSSIs) that are each associated with different portions of the core network (CN) or access network. An NSSI represents a group of NFs and may be associated with one or more NSIs. This permits the lifecycle of the NSSI to be managed independently from the lifecycle of an NSI. The NSSIs may be implemented as different core networks, such RAN and 5GC.

Figure 3B:
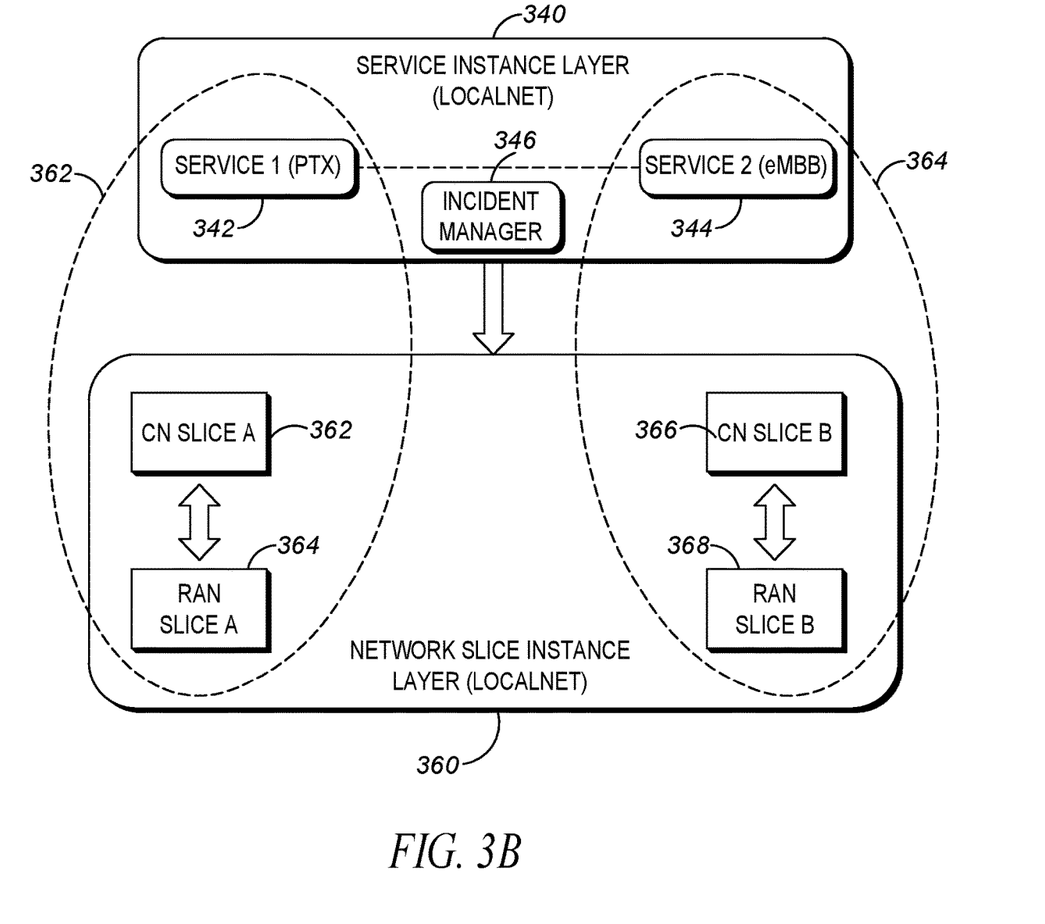
FIG. 3B illustrates network slice creation in accordance with some embodiments.

Accordingly, FIG. 3B illustrates network slice creation in accordance with some embodiments. As shown, multiple communication service instances may be instantiated by an incident manager 356 in a service instance layer 350 of the local network (LocalNet). Service instance layer 350 may communicate with the MNVO of a network business entity that shares the physical network to provide the service requirements. Service instance layer 350 may direct an NSI layer 360 of the LocalNet to create one or more NSIs for the desired communication services based on the service requirements. The communication services may include, for example, a push-to-anything (PTX) service 352 and an eMBB service 354, although other services (such as URLLC, IoT service, intercommunication via a common application, subscription to sensor data, and access to group contact list/phonebook) may also be provided by one or more of the NSIs. PTX service 352 may be provided by NSI layer 360 in a PTX NSI 362, while eMBB service 354 may be provided in an eMBB NSI 364. The different parts of an NSI are grouped as Network Slice Subnets (e.g., RAN, 5GC and Transport) allowing the lifecycle of a Network Slice Subnet Instance (NSSI) to be managed independently from the lifecycle of an NSI. The underlying physical architecture for each of PTX NSI 362 and eMBB NSI 364 includes a core network (CN) slice 362, 366 that provides CN services (e.g., AMF, SMF) and a RAN slice 364, 368 that provides that provides access to the network.

Note that while a specific embodiment is shown in which the entirety of both the RAN and CN are incorporated in a network slice, in FIG. 3B, other network slicing embodiments may be used. In particular, elements of the RAN (such as the central and distributed units in a gNB) and CN may be partitioned into network slices. A network slice may thus incorporate elements of the RAN and/or elements of the CN.

The use of virtualization and network slicing in 5G networks may be used to provide interconnectability among first responders from different agencies (i.e., cross-agency communications) as well as deliver desired services at an incident scene that are particularized to the incident scene. In particular, reporting of an incident may trigger creation of one or more NSIs each used to deliver a different service (e.g., PTT, IoT, mMTC communications) to UEs at the incident scene using common control plane network functions to enable UE mobility for UEs connected to more than one NSI. UEs at the incident scene, whether mobile or stationary, may establish a PDU session (the UE may be simultaneously connected with up to 8 network slices, that each UE may have other PDU sessions with different Data Network Names (DNNs) through different network slices) or attach to one or more of the appropriate NSIs until the incident is over, at which point the NSIs are cancelled and the UEs may be reconfigured to the state prior to the incident. While the incident is in progress, the UEs at the incident scene may use a common application having a common phonebook shared by all UEs running the application and enabling PTT communication amongst all of these UEs. The phonebook may contain connectivity information (such as unique IDs) for the UEs that allows the UEs to communicate via PTT via an OMA-PoC or MCPTT session. Some UEs may be connected to a single NSI, while other UEs may be connected to multiple NSIs, dependent on the purpose and capabilities of the UE. The UEs that are connected to multiple NSIs may be connected to different sets of the NSIs.

As shown in FIG. 3A, NSIs 362, 364 of FIG. 3B may be created and controlled through NFV-MANO 320 (through interaction with the incident manager, as described in more detail below). To enable creation and control of various NSIs in general, the allocation and configuration of the resources to provide the desired services may be determined, as may the logic, types and interconnection of NFs allocated to provide each desired service. Control of the lifecycle (instantiation, modification, and cancellation) of the NFs and NSIs may be dynamic and thus based on changing parameters of the service, controlled by the capabilities and resources to be used by the UEs to establish a PDU session/attach to each NSI and use particular NF(s) associated with the NSI. To implement these features, multiple logical devices may be implemented, including an incident manager, a network slice controller, and a slice QoS controller. In general, the incident manager may gather relevant information of the incident and manage both the UEs and creation of the NSI. The network slice controller may dynamically allocate network functions within each NSI. The slice QoS controller may control QoS service of communication flow within each NSI.

With the above in mind, devices, such as those described in FIG. 2 can utilize a network slice identity to as part of a discovery process for D2D communications such that upon loss of a network, devices having a same network slice will be utilized for D2D communications amongst each other. Additionally, because some devices 200 are members of more than one network slice, these devices may be used as a bridge between network slices when the communication system goes down, or is otherwise unavailable.

In order to accomplish this, devices that will participate in D2D communications must know each other's network slice identities. In one embodiment, network-independent discovery is performed, where devices perform the discovery procedure autonomously, without assistance from the network. This type of discovery is useful when devices lie outside the network coverage. With this in mind, each device may broadcast their network slice identity as part of a discovery process upon a network being down, or otherwise unavailable. Thus, in this particular embodiment, upon detection that a network is down, or otherwise unavailable, each device will broadcast its network slice identification as part of a D2D discovery process. Devices 200 that receive other devices network slice information can store this information within memory 204 (along with other information potentially needed for D2D communications).

Alternatively, network equipment (such as each equipment associated with each NSI) may periodically broadcast each devices network slice identity, which may be received via network interface 210 and stored in memory 204. This information may be accessed upon discovery that the network is down, or otherwise unavailable.

It should be noted that other information may also be shared when discovering devices capable of D2D communications. For example, a GPS sensor 206 may be utilized to determine location information, which may be shared among devices attempting D2D communications in a similar manner in which network slice identification is shared. This information may also be utilized in determining what devices D2D communications can take place with.

As discussed above, some devices 200 may belong to more than one network slice. Thus, these devices 200 will broadcast all of their network-slice information when performing discovery for D2D communications. Alternatively, network infrastructure may broadcast this information for use when D2D communications takes place.

Additionally, during D2D communications, some devices 200 may be utilized to bridge network slices. More particularly, some devices may be used to receive communications over a first network slice and relay those communications to a device existing on a second network slice. These bridging devices will be in communication with at least two devices on two separate network slices. It is evident, that for a communication device 200 to serve as a bridge between network slices, the communication device 200 will need to be a member of each network slice. A bridge device 200 may be chosen based on any number of attributes, including, but not limited to whether or not the device is communicating over a 5G network, whether or not the bride device 200 is mobile, an amount of battery life left on the bridge device 200, . . . , etc. Also, a bridge device can be also the controller of the network slice policy enforcement, e.g. if the inner network slice communication is near the upper limit of its bandwidth policy the bridge will decrease the internetwork slice communication bandwidth.

With the above in mind, FIG. 2 shows an apparatus 200 comprising memory 204 used for storing network slice information for a plurality of devices, the network slice information identifying network slices used for each of the plurality of devices. Processor 202 is provided and configured to determine network slices being used by apparatus 200, determine that a network is down, or otherwise unavailable, access memory 204 to determine the network slices being used for the plurality of devices, and establish a device-to-device (D2D) communication with a first device from the plurality of devices based on at least one network slice used for the first device matching at least one network slice being used by the apparatus.

As discussed above, the network slices being used by the apparatus comprises virtual networks created on top of a common physical infrastructure. Additionally, during non-network assisted D2D discovery, network interface 210 is provided and configured to receive the network slice information for the plurality of devices directly via a D2D discovery process with the plurality of devices. Additionally, during network-assisted D2D discovery, network interface 210 configured to receive the network slice information at network interface 210 for the plurality of devices from network infrastructure equipment prior to the network being determined as down or otherwise unavailable.

Additionally, apparatus 200 can comprise a UE and also serve as a bridge node between network slices. When this is the case, processor 202 is further configured to establish a device-to-device (D2D) communications via network interface 210 with a second device from the plurality of devices based on the network slice used for the second device matching at least one network slice being used by the apparatus, and serve as a bridge device between the first device and the second device.

With the above in mind, FIG. 2 shows an apparatus 200 comprising network interface 210 configured to receive network slice information for a plurality of devices via a D2D discovery process with the plurality of devices, or alternatively receive the network slice information for the plurality of devices via network infrastructure equipment prior to the network being determined as down or otherwise unavailable. Processor 202 is configured to determine network slices being used by the apparatus, determine that a network is down, or otherwise unavailable, determine the network slices being used for the plurality of devices; and establish a device-to-device (D2D) communication utilizing network interface 210 with a first device from the plurality of devices based on at least one network slice used for the first device matching at least one network slice being used by the apparatus.

It should be noted that as part of a discovery process, processor 202 will cause network interface 210 to transmit information on a current network slice utilized by the apparatus to the plurality of devices via a D2D discovery process with the plurality of devices. Thus configuring network interface to transmit the current network slice utilized by the apparatus.

Figure 4:
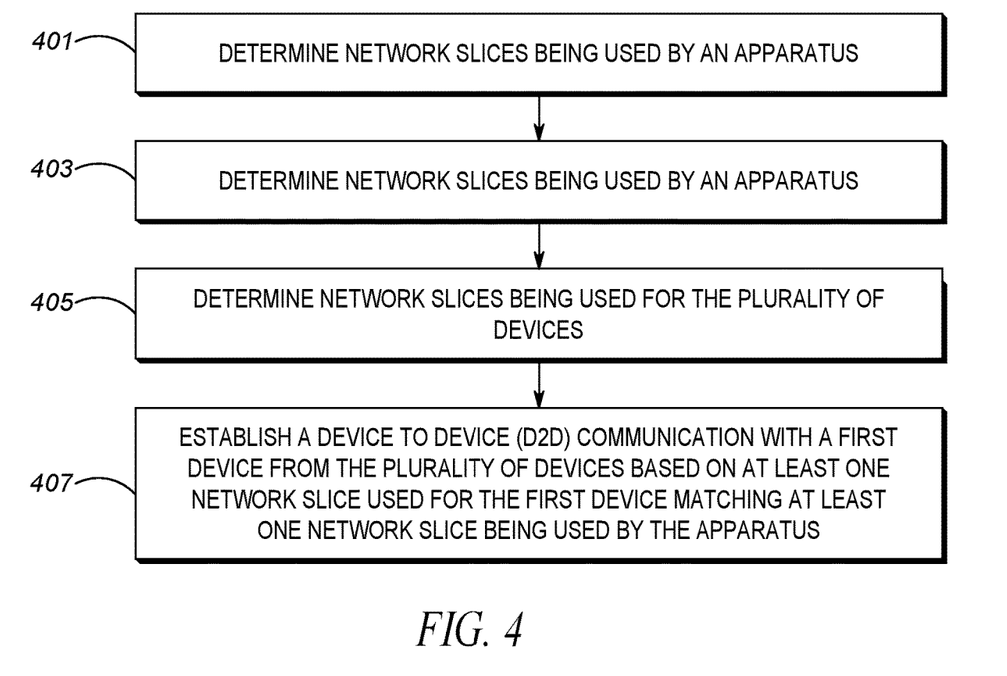
FIG. 4 is a flow chart showing operation of discovery of D2D devices.

FIG. 4 is a flow chart showing operation of device 200. The logic flow begins at step 401 where logic circuitry 202 determines network slices being used by apparatus 200. At step 403, logic circuitry 202 determines that a network is down, or otherwise unavailable. The logic flow continues to step 405 where logic circuitry 202 determines network slices being used for the plurality of devices. Finally, at step 407, logic circuitry 202 establishes a device-to-device (D2D) communication with a first device from the plurality of devices based on at least one network slice used for the first device matching at least one network slice being used by the apparatus.

As discussed above, the step of determining network slices being used for the plurality of devices may comprise the step of receiving the network slice information for the plurality of devices via a D2D discovery process with the plurality of devices.

As discussed above, the step of determining network slices being used for the plurality of devices may comprise the step of receiving the network slice information for the plurality of devices via network infrastructure equipment prior to the network being determined as down or otherwise unavailable.

As discussed above, apparatus 200 may be used as a bridge node. When this occurs, logic circuitry 202 establishes a device-to-device (D2D) communications with a second device from the plurality of devices based on the network slice used for the second device matching at least one network slice being used by the apparatus, and serves as a bridge device between the first device and the second device. As discussed, the bridge device may enforce network slices policies such as controlling an amount of bandwidth for each network slice.

As described herein, modules and components are tangible entities (e.g., hardware/circuitry) capable of performing specified operations and are configured or arranged in a specific manner to enable the operations to be performed. This arrangement may include an internal arrangement of a particular module or an external arrangement of the module respect to other modules. For example, a server or one or more processors may be configured by firmware or software as a module that operates to perform the operations. Accordingly, the term module, component, circuitry, and the like is understood to encompass a physically constructed, specifically configured tangible entity that is permanently or temporarily arranged to perform any operation described herein. Where the modules include a general-purpose processor configured using software, the general-purpose processor may be configured as different modules at different times or under different conditions.

Although the processes described herein describe the operations as sequential processes, some of the operations may be performed in parallel and/or may be rearranged. Each process may also have additional steps not included in the figure describing the process. The processes may be implemented in software and/or firmware, the code of which, as above, may be stored in a machine or computer readable medium, such as a non-transitory storage medium and implemented by processing circuitry to perform the desired operations.

Although the terms first, second, etc. may be used herein to describe various elements, these elements should not be limited by these terms. These terms are only used to distinguish one element from another. As used herein, the term "and/or" includes any and all combinations of one or more of the associated listed items. Similarly, as used herein and unless otherwise indicated, "a," "an," and "the" are intended to include one or more of the associated element. The terms "comprising," "including," "having," "containing," and other similar terms, unless otherwise specified, do not preclude the presence or addition of one or more other features, operations, elements, component, or the like.

In the interest of not obscuring the presentation of embodiments in the detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments described herein.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus comprising:
   a memory storing network slice information for a plurality of devices, the network slice information identifying network slices used for each of the plurality of devices; and
   a processor configured to:
      determine network slices being used by the apparatus;
      determine that a network is down, or otherwise unavailable;
      determine the network slices being used for the plurality of devices;
      establish a device-to-device (D2D) communication with a first device from the plurality of devices based on at least one network slice used for the first device matching at least one network slice being used by the apparatus; and
   a network interface configured to receive the network slice information for the plurality of devices via network infrastructure equipment prior to the network being determined as down or otherwise unavailable.

2. The apparatus of claim 1 further comprising:
   a network interface configured to receive the network slice information for the plurality of devices via a D2D discovery process with the plurality of devices.

3. The apparatus of claim 1 wherein the network slices being used by the apparatus comprises virtual networks created on top of a common physical infrastructure.

4. The apparatus of claim 1 further comprising:
   a network interface configured to transmit information on a current network slice utilized by the apparatus to the plurality of devices via a D2D discovery process with the plurality of devices.

5. An apparatus comprising:
   a memory storing network slice information for a plurality of devices, the network slice information identifying network slices used for each of the plurality of devices; and
   a processor configured to:
      determine network slices being used by the apparatus;
      determine that a network is down, or otherwise unavailable;
      determine the network slices being used for the plurality of devices;
   establish a device-to-device (D2D) communication with a first device from the plurality of devices based on at least one network slice used for the first device matching at least one network slice being used by the apparatus;
      establish a device-to-device (D2D) communications with a second device from the plurality of devices based on the network slice used for the second device matching at least one network slice being used by the apparatus; and
   serve as a bridge device between the first device and the second device.

6. The apparatus of claim 5 further comprising:
   a network interface configured to receive the network slice information for the plurality of devices via a D2D discovery process with the plurality of devices.

7. The apparatus of claim 5 further comprising:
   a network interface configured to transmit information on a current network slice utilized by the apparatus to the plurality of devices via a D2D discovery process with the plurality of devices.

8. The apparatus of claim 5 wherein the network slices being used by the apparatus comprises virtual networks created on top of a common physical infrastructure.

9. A method comprising the steps of:
   determining network slices being used by an apparatus;
   determining that a network is down, or otherwise unavailable;
   determining network slices being used for a plurality of devices; and
   establishing a device-to-device (D2D) communication with a first device from the plurality of devices based on at least one network slice used for the first device matching at least one network slice being used by the apparatus;
   wherein the step of determining network slices being used for the plurality of devices comprises the step of receiving network slice information for the plurality of devices via network infrastructure equipment prior to the network being determined as down or otherwise unavailable.

10. The method of claim 9 wherein the step of determining network slices being used for the plurality of devices comprises the step of receiving network slice information for the plurality of devices via a D2D discovery process with the plurality of devices.

11. The method of claim 9 wherein the network slices being used by the apparatus comprises virtual networks created on top of a common physical infrastructure.

12. A method comprising the steps of:
   determining network slices being used by an apparatus;
   determining that a network is down, or otherwise unavailable;
   determining network slices being used for a plurality of devices;
   establishing a device-to-device (D2D) communication with a first device from the plurality of devices based on at least one network slice used for the first device matching at least one network slice being used by the apparatus;
   establishing a device-to-device (D2D) communications with a second device from the plurality of devices based on the network slice used for the second device matching at least one network slice being used by the apparatus; and
   serving as a bridge device between the first device and the second device.

13. The method of claim 12 wherein the bridge device enforces network slices policies.

14. The method of claim 12 wherein the step of determining network slices being used for the plurality of devices comprises the step of receiving network slice information for the plurality of devices via a D2D discovery process with the plurality of devices.

15. The method of claim 12 wherein the network slices being used by the apparatus comprises virtual networks created on top of a common physical infrastructure.

16. An apparatus comprising:
   a network interface configured to receive network slice information for a plurality of devices via a D2D discovery process with the plurality of devices, or alternatively receive the network slice information for the plurality of devices via network infrastructure equipment prior to the network being determined as down or otherwise unavailable; and
   a processor configured to:
      determine network slices being used by the apparatus;
      determine that a network is down, or otherwise unavailable;
      determine the network slices being used for the plurality of devices;
      establish a device-to-device (D2D) communication with a first device from the plurality of devices based on at least one network slice used for the first device matching at least one network slice being used by the apparatus;
      establish a device-to-device (D2D) communications with a second device from the plurality of devices based on the network slice used for the second device matching at least one network slice being used by the apparatus; and
      serve as a bridge device between the first device and the second device;
   wherein the network slices being used by the apparatus comprises virtual networks created on top of a common physical infrastructure.

* * * * *